UNITED STATES PATENT OFFICE.

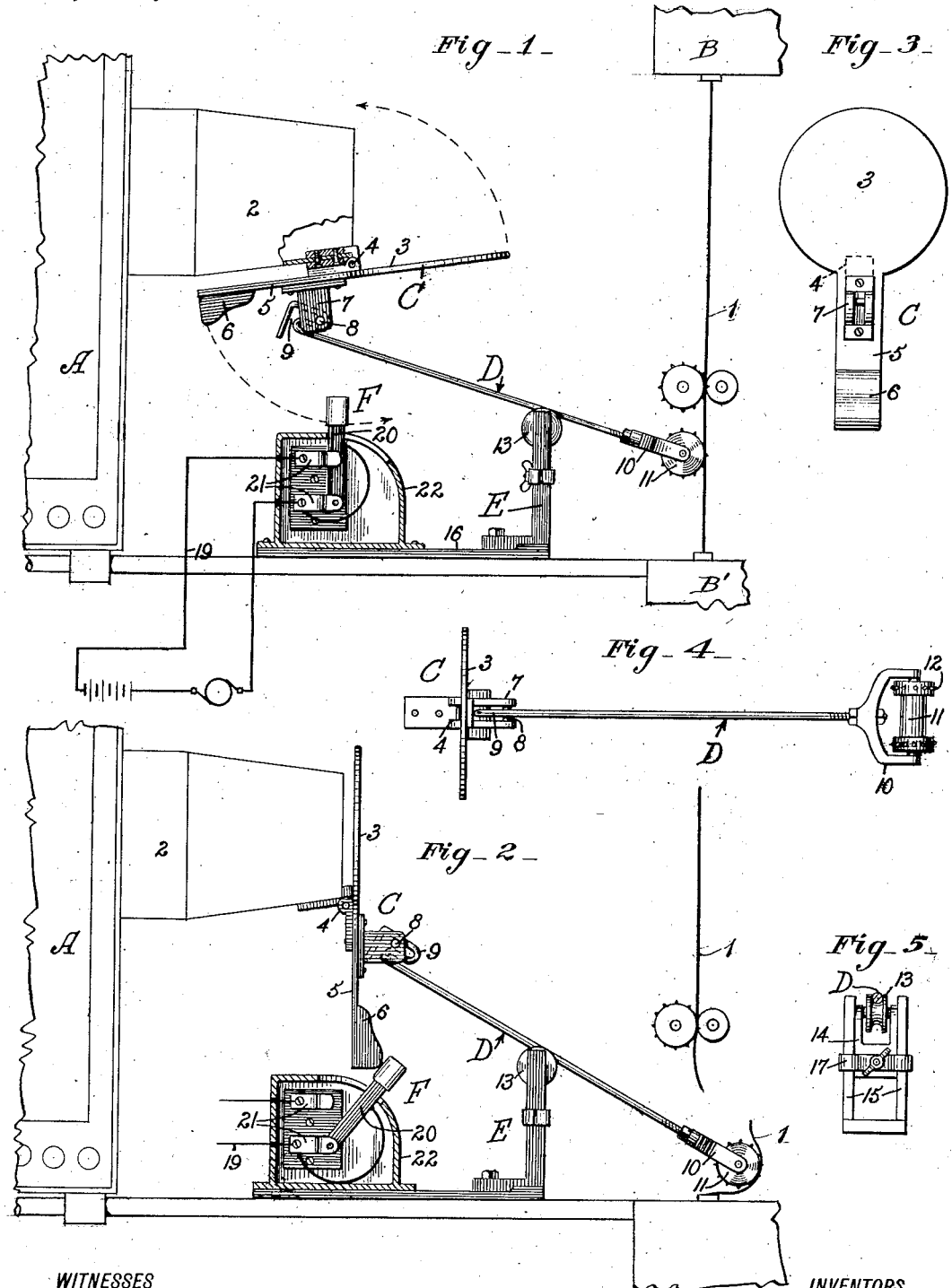

JACOB L. ULMER AND IRVIN J. ULMER, OF LOUISVILLE, KENTUCKY.

FIRE-PREVENTING ATTACHMENT FOR MOVING-PICTURE MACHINES.

1,250,724.

Specification of Letters Patent. Patented Dec. 18, 1917.

Application filed May 22, 1917. Serial No. 170,227.

*To all whom it may concern:*

Be it known that we, JACOB L. ULMER and IRVIN J. ULMER, citizens of the United States, and residents of Louisville, in the county of Jefferson and State of Kentucky, have invented a new and Improved Fire-Preventing Attachment for Moving-Picture Machines, of which the following is a full, clear, and exact description.

This invention relates to moving picture machines, and more particularly to a fire preventing attachment therefor, so that when the film breaks the electric power will be automatically cut off from the machine.

The invention has for its general objects to improve and simplify the construction and operation of devices of this character so as to be reliable and efficient in use, comparatively simple and inexpensive to manufacture and apply, and so designed as to immediately open the electric circuit when the film breaks.

A more specific object of the invention is the provision of a shutter device for the hood of the lamp house of the moving picture machine, which device is normally held open by a member having a running contact with the film, and when the film breaks the member permits the shutter device to automatically close, and in closing, the said device throws open the switch of the electric circuit of the moving picture machine, the shutter device, switch and film-engaging member forming an attachment which can be readily applied to machines already in use.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view with portions in section of the attachment applied to a moving picture machine with the parts in normal condition;

Fig. 2 is a similar view showing the film broken and the attachment as having operated;

Fig. 3 is a front view of the shutter device;

Fig. 4 is a plan view of the shutter and the film-engaging member; and

Fig. 5 is a detail view of the support for the film-engaging member.

Referring to the drawing, A designates the lamp house of a moving picture machine, B, B' the magazines, 1 the film therein, and 2 the hood of the lamp house. The attachment comprises a shutter device C, a film-engaging member D connected with the shutter device and normally engaging the film, a support E for the member D, and a switch F for the electric circuit of the moving picture machine.

The shutter device C comprises a plate 3 which is connected by a hinge 4 to the bottom of the hood 2, and on the plate 3 is a member 5 which carries a weight 6, so that when the shutter device is unrestrained it will assume a vertical position directly in front of the hood and close the same, as shown in Fig. 2. The shutter device has a lug 7 projecting therefrom and which is provided with a pin 8 which serves to connect the member D with the shutter device. This member D is in the form of a rod having its end 9 bent into a hook which engages the pin 8, and the opposite end of the rod carries a yoke 10 in which is rotatably mounted a wheel 11 provided with pin teeth 12 that engage in the usual rows of perforations of the film 1. The parts are so proportioned and arranged that when the film 1 is intact, the member D is held to one side of a position which it would occupy if freed, and consequently when the film breaks, the shutter device C and member D will automatically shift from the position shown in Fig. 1 to that shown in Fig. 2.

The member D is movably supported by riding on a grooved pulley 13 disposed in a frame 14 which is slidable between posts 15 rising from the base plate 16. Clamps 17 on the frame 14 engage the posts 15 to hold the frame and pulley 13 in proper position of adjustment.

The electric circuit 19 of the moving picture machine is controlled by the switch F, which is of any suitable construction and embodies a movable member or contact 20, so disposed with respect to the path of the weight 6 that as the latter descends it will impart a blow to the member 20 and cause the same to disengage the fixed contacts 21 of the switch, such switch contacts being arranged in a housing 22 which is fastened to the base plate 16. It will thus be seen that when the film breaks, two things occur, namely, the moving of the shutter device C to closed position and the opening of the switch F.

From the foregoing description taken in connection with the accompanying drawing, the advantages of the construction and method of operation will be readily understood by those skilled in the art to which the invention appertains, and while we have described the principle of operation, together with the attachment which we now consider to be the best embodiment thereof, we desire to have it understood that the attachment shown is merely illustrative and that such changes may be made when desired as fall within the scope of the appended claims.

Having thus described our invention, we claim as new and desire to secure by Letters Patent:

1. In a moving picture machine, the combination of a lamp house having a hood, a magazine having film-carrying means, a movable shutter for the hood, a member operatively connected with the shutter and with the film in the magazine, whereby the latter holds the shutter open, and an electric switch for the moving picture machine circuit, said switch including a member arranged to be moved to open-circuit position by the closing of the shutter.

2. In a moving picture machine, the combination of a lamp house having a hood, a pivoted shutter thereon having a weighted member, a switch controlling the circuit of the moving picture machine, said switch including a member arranged to be hit by the weighted member of the shutter to open circuit the switch when the shutter closes, a member operatively connected with the shutter, a magazine having a film and with which the member has a running engagement, and a support for the last-mentioned member.

3. In a moving picture machine, the combination of a hood, a shutter therefor, a film, a longitudinally movable, rigid member pivotally connected with the shutter and provided with toothed wheels having a running engagement with the film, whereby the latter operates through the member to hold the shutter open, and an adjustable support for the said member at a point intermediate its ends.

4. In a moving picture machine, the combination of a hood, a shutter therefor, a film, a member pivotally connected with the shutter and provided with toothed wheels having a running engagement with the film, whereby the latter operates through the member to hold the shutter open, an adjustable support for the said member at a point intermediate its ends, and a switch arranged to automatically open when the film breaks and permit the member and shutter to move.

JACOB L. ULMER.
IRVIN J. ULMER.